United States Patent
Lee

(12) 
(10) Patent No.: US 6,174,135 B1
(45) Date of Patent: Jan. 16, 2001

(54) TURBINE BLADE TRAILING EDGE COOLING OPENINGS AND SLOTS

(75) Inventor: Ching-Pang Lee, Cincinnati, OH (US)

(73) Assignee: General Electric Company, Cincinnati, OH (US)

(*) Notice: Under 35 U.S.C. 154(b), the term of this patent shall be extended for 0 days.

(21) Appl. No.: 09/345,190

(22) Filed: Jun. 30, 1999

(51) Int. Cl.[7] .................................................. F01D 5/18
(52) U.S. Cl. ............................................................ 416/97 R
(58) Field of Search ............................... 416/96 R, 96 A, 416/97 R, 97 A; 415/115, 116

(56) References Cited

U.S. PATENT DOCUMENTS

| | | | |
|---|---|---|---|
| 4,726,104 | * | 2/1988 | Foster et al. ........................ 416/97 R |
| 5,215,431 | * | 6/1993 | Derrien ................................ 416/97 R |
| 5,342,172 | * | 8/1994 | Coudray et al. .................... 416/97 R |
| 5,503,527 | * | 4/1996 | Lee et al. ............................. 416/97 R |
| 5,503,529 | * | 4/1996 | Anselmi et al. .................... 416/97 R |
| 5,772,398 | * | 6/1998 | Noiret et al. ........................... 415/115 |

* cited by examiner

*Primary Examiner*—Christopher Verdier
(74) *Attorney, Agent, or Firm*—Andrew C. Hess; Rodney M. Young

(57) ABSTRACT

A turbine blade including an airfoil having a plurality of trailing edge slots and a plurality of trailing edge openings for use in a turbine engine is described. The trailing edge slots extend along a pressure side wall to the trailing edge at an upper portion of the blade. The trailing edge openings extend through the trailing edge at a lower portion of the blade. The trailing edge at the upper portion of the airfoil is relatively thin in comparison to the trailing edge at the lower portion of the airfoil, which allows for high aerodynamic efficiency and cooling of the airfoil.

20 Claims, 3 Drawing Sheets

TURBINE BLADE TRAILING EDGE COOLING OPENINGS AND SLOTS

BACKGROUND OF THE INVENTION

This invention relates generally to turbine engines and, more particularly, to apparatus and methods for cooling a turbine blade trailing edge.

A turbine engine typically includes a core engine having, in serial flow relationship, a high pressure compressor which compresses an airflow entering the core engine, a combustor in which a mixture of fuel and compressed air is burned to generate hot propulsive gases, and a high pressure turbine which is rotated by the hot propulsive gases. The high pressure turbine is connected to the high pressure compressor by a shaft so that the high pressure turbine blades drive the high pressure compressor. Additional compressors and turbine blades (e.g., a low pressure compressor and a low pressure turbine) may be positioned in serial flow relationship with the core engine. As used herein, the term "turbine blades" refers to the high pressure turbine blades and low pressure turbine blades.

A turbine blade typically includes an airfoil, a platform, a shank, and a dovetail. The platform is connected to a root of the airfoil and the shank. The shank is connected to the dovetail, through which the cooling air is directed. The airfoil includes a leading edge and a trailing edge, with the trailing edge being relatively thin in comparison to the leading edge. The airfoil further includes an upper portion, a lower portion, and a tip. The tip and the root are connected to the leading edge and the trailing edge at the upper portion and the lower portion of the airfoil, respectively.

A greater operating efficiency and power output of the turbine engine is achieved through higher operating temperatures. Operating temperatures are limited, however, by a maximum temperature tolerable by the rotating turbine blades, along with problems associated with tension and stress caused by increased rotation of the turbine blades. Typically, cooling air is extracted from an outlet of the compressor and utilized to cool, for example, turbine blades.

Optimization of aerodynamic efficiency creates problems with operating conditions of the airfoil, and optimization of the operating conditions creates problems with the aerodynamic efficiency. In operation, aerodynamic losses predominately occur at the upper portion of airfoils with a thick trailing edge due to radial distribution of the hot propulsive gases. However, a thin trailing edge increases the likelihood that the lower portion of the airfoil will fail due, at least in part, to high centrifugal stresses during operation, when combined with the high operating temperatures.

BRIEF SUMMARY OF THE INVENTION

In an exemplary embodiment of the invention, a turbine blade airfoil includes a plurality of slots on an upper portion of the airfoil and a plurality of trailing edge openings through a lower portion of the airfoil. The turbine blade also includes a shank, a platform, and a dovetail. The airfoil is connected to the platform at a root and further includes at least one cooling cavity located between a pressure side wall and a suction side wall which extend from a leading edge of the airfoil to a trailing edge of the airfoil.

More specifically, the upper portion of the airfoil includes a thin trailing edge. The slots extend from the pressure side wall of the airfoil to the trailing edge. The lower portion of the airfoil includes a thicker trailing edge than the upper portion trailing edge. The trailing edge openings extend through the trailing edge and provide convection cooling to the lower portion of the trailing edge. The slots cool the upper portion of the airfoil utilizing a combination of convection cooling for the airfoil and film cooling for the upper portion of the trailing edge.

Utilizing the above described airfoil with the combination of slots and trailing edge openings improves the performance and durability of the turbine blade. The performance of the turbine blade is improved by utilizing a thin trailing edge at the upper portion of the airfoil which is effectively cooled by the slots. The durability of the turbine blade is improved by including a trailing edge at the lower portion of the airfoil which has a greater width than the upper portion trailing edge and which is cooled by the trailing edge openings extending through the lower portion trailing edge.

DETAILED DESCRIPTION OF THE INVENTION

Figure 1:
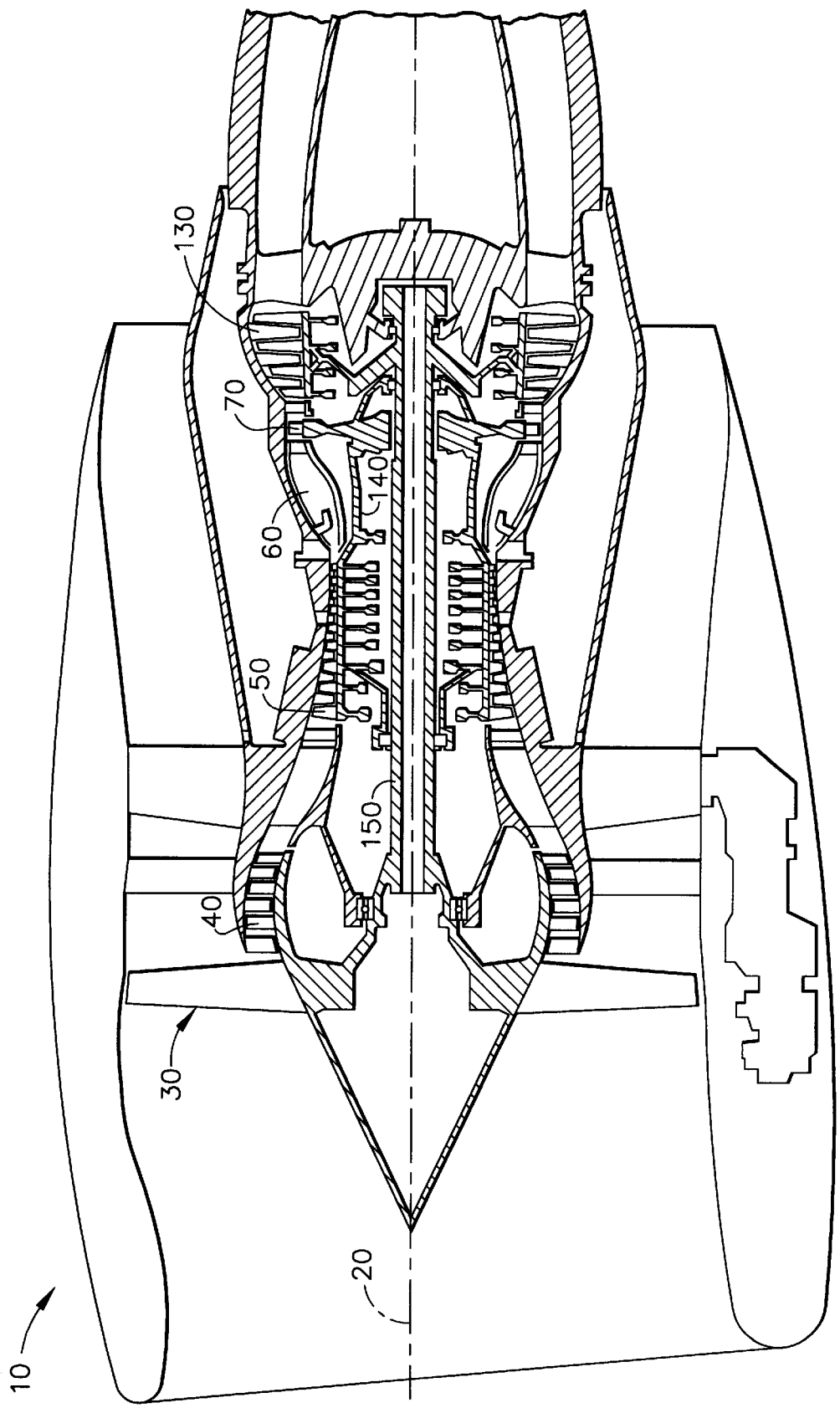
FIG. 1 is a cross sectional view of a turbine engine including a high pressure turbine.

FIG. 1 is a cross sectional illustration of a turbine engine 10 symmetrical about a central axis 20. Engine 10 includes, in serial flow communication, a front fan 30, a multistage low pressure compressor, or booster, 40, a multistage high pressure compressor 50, a combustor 60, a high pressure turbine 70, and a multistage low pressure turbine 130. High pressure turbine 70 is connected to high pressure compressor 50 by a high pressure shaft 140. Low pressure turbine 130 is connected to front fan 30 and booster 40 by low pressure shaft 150.

During operation of engine 10, air flows downstream through fan 30 and into multistage low pressure compressor 40. The air is compressed and continues to flow downstream through high pressure compressor 50 where the air becomes highly pressurized. A portion of the highly pressurized compressed air is directed to combustor 60, mixed with fuel, and ignited to generate hot, highly pressurized propulsive gases which flow further downstream and are utilized by high pressure turbine 70 to drive high pressure compressor 50. The hot, highly pressurized propulsive gases expand and lose some of their energy and continue to flow further downstream. The gases are utilized by multistage low pressure turbine 130 to drive front fan 30 and booster 40.

Figure 2:
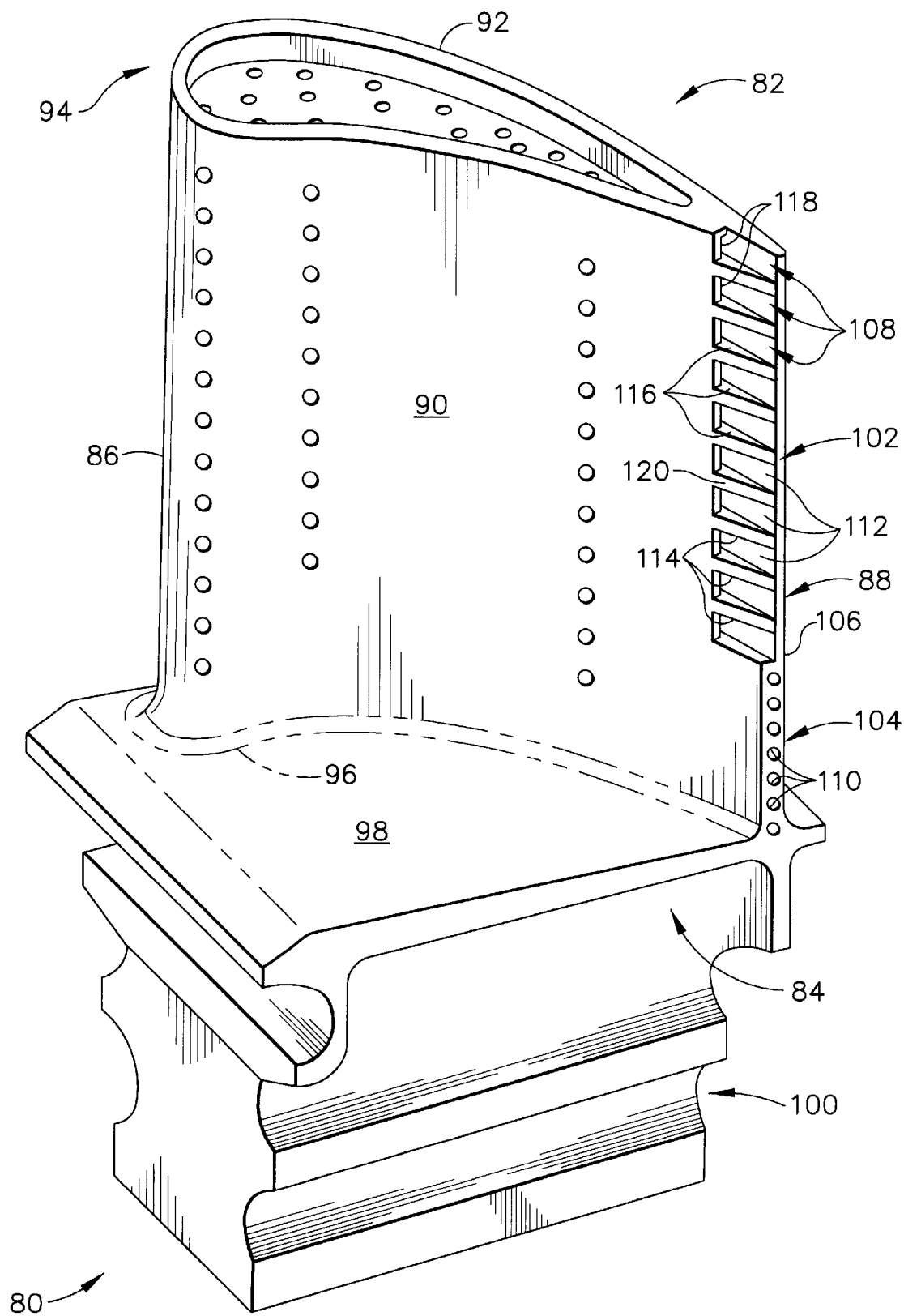
FIG. 2 is a perspective view of the high pressure turbine blade shown in FIG. 1.

FIG. 2 illustrates a high pressure turbine blade 80 of high pressure turbine 70 (shown in FIG. 1). As shown in FIG. 2, high pressure turbine blade 80 includes an airfoil 82 connected to a shank 84. Airfoil 82 includes a leading edge 86, a trailing edge 88, a pressure side wall 90, and a suction side wall 92. Pressure side wall 90 is connected to suction side wall 92 at leading edge 86 and trailing edge 88. Airfoil 82 further includes a tip 94 and a root 96 connected by pressure side wall 90, suction side wall 92, leading edge 86, and trailing edge 88. Shank 84 includes a platform 98 and a dovetail 100. Airfoil 82 is connected at root 96 to platform 98. Airfoil 82 includes a trailing edge upper portion 102 which extends from tip 94, and a trailing edge lower portion 104 which extends to root 96. Upper portion 102 and lower portion 104 meet at a trailing edge mid-portion 106.

Turbine blade 80 includes at least one cooling cavity (not shown in FIG. 2) between pressure side wall 90 and suction side wall 92. The cooling cavity is in flow communication with a plurality of trailing edge slots 108 which extend along trailing edge 88 and a plurality of trailing edge openings 110 which extend through trailing edge 88. Trailing edge slots 108 are substantially rectangular and extend along pressure side wall 90 to trailing edge 88 at airfoil upper portion 102. Trailing edge openings 110 are substantially circular and extend through trailing edge 88 at airfoil lower portion 104.

Each trailing edge slot 108 includes a recessed wall 112 separated from pressure side wall 90 by a first side wall 114 and a second side wall 116. A cooling cavity exit opening 118 extends from the cooling cavity to each trailing edge slot 108 adjacent recessed wall 112. Each recessed wall 112 extends from trailing edge 88 to cooling cavity exit opening 118. A plurality of lands 120 separate each trailing edge slot 108 from an adjacent trailing edge slot 108. Side walls 114 and 116 extend from lands 120. In an alternative embodiment, trailing edge openings 110 are substantially rectangular.

Figure 3:
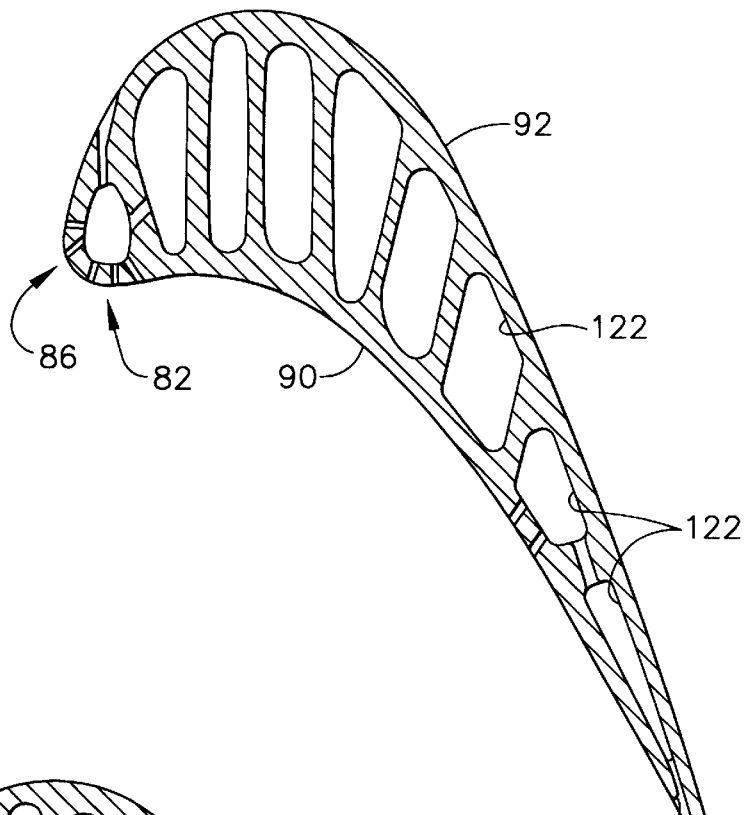
FIG. 3 is a cross-sectional view of an upper portion of an airfoil utilized in the high pressure turbine blade shown in FIG. 2.
Figure 4:
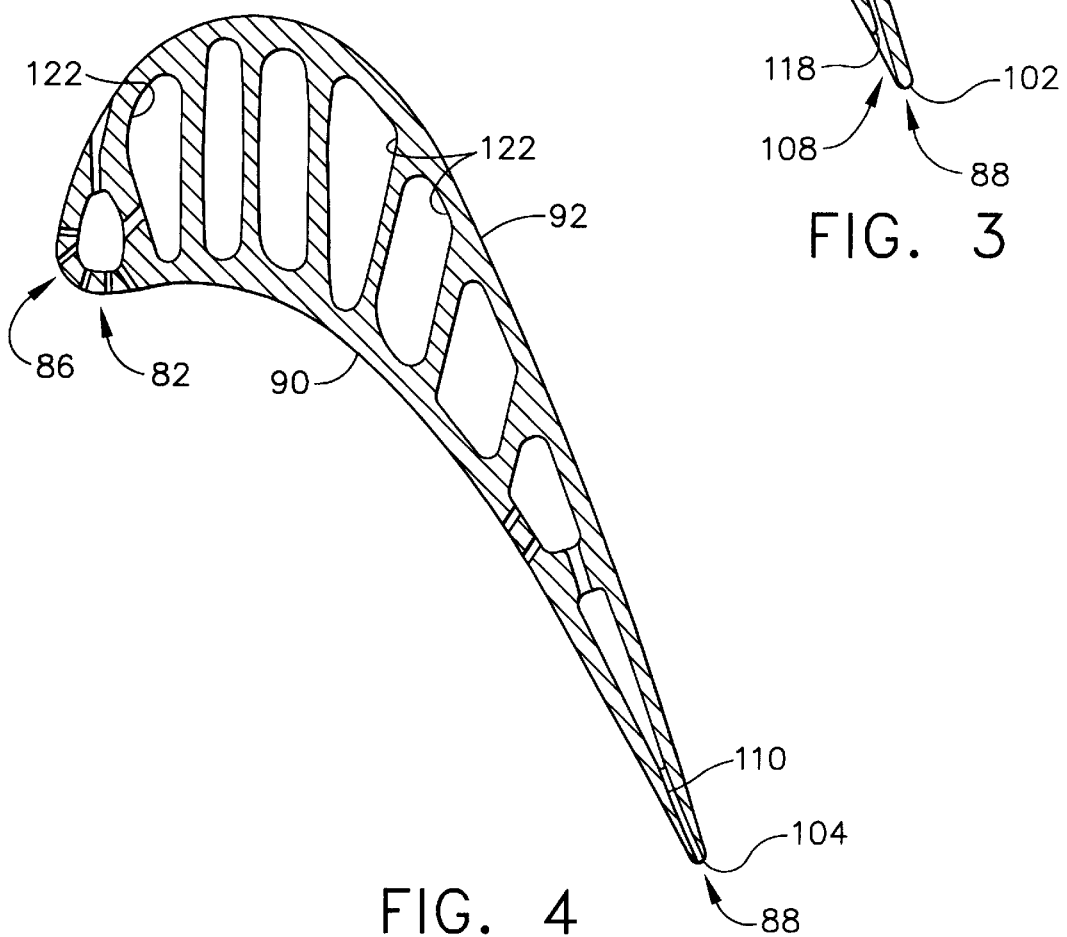
FIG. 4 is a cross-sectional view of a lower portion of the airfoil shown in FIG. 2.

FIGS. 3 and 4 are cross-sectional illustrations of upper portion 102 and lower portion 104 of airfoil 82 shown in FIG. 2. As shown in FIGS. 3 and 4, airfoil 82 includes a cooling cavity 122 therein. In one embodiment, cooling cavity 122 is serpentine in configuration as is well known in the art. As shown in FIG. 3, each cooling cavity exit opening 118 of each trailing edge slot 108 extends from cooling cavity 122 to pressure side wall 90. Whereas, as shown in FIG. 4, each trailing edge opening 110 extends from cooling cavity 122 through trailing edge 88 at lower portion 104.

During operation of turbine engine 10 (shown in FIG. 1), hot propulsive gases exit combustor 60 (shown in FIG. 1), are directed through high pressure turbine 70 (shown in FIG. 1), and contact each turbine blade 80. Cooling air is extracted from high pressure compressor 50 and is directed through dovetail 100 of turbine blade 80. The cooling air enters root 96 through shank 84 and dovetail 100 and is provided to the cooling cavity in airfoil 82. The cooling air cools upper portion 102 and lower portion 104 of trailing edge 88.

Upper portion 102 is cooled by directing the cooling air into cooling cavity 122 and through trailing edge slots 108. The cooling air cools pressure side wall 90 and suction side wall 92 utilizing convection cooling. Due to the location of each trailing edge slot 108 on pressure side wall 90, the cooling air exits each trailing edge slot 108 through cooling cavity exit openings 118 along each recessed wall 112 and cools upper portion 102 of trailing edge 88 utilizing film cooling. Lower portion 104 is cooled by directing the cooling air into cooling cavity 122 and through trailing edge openings 110. The cooling air exits each trailing edge opening 110 at lower portion 104 and cools trailing edge 88 utilizing convection cooling.

Upper portion 102 of trailing edge 88 is thin, in comparison to lower portion 104 of trailing edge 88, and reduces aerodynamic losses which would occur with thick trailing edges. Lower portion 104 includes a thick trailing edge 88, in comparison to upper portion 102, which reduces the likelihood that lower portion 104 will crack at root 96 along trailing edge 88 due to centrifugal stress. The combination of trailing edge slots 108 and trailing edge openings 110 effectively cool and preserve the aerodynamic efficiency of airfoil 82.

While the invention has been described in terms of various specific embodiments, those skilled in the art will recognize that the invention can be practiced with modification within the spirit and scope of the claims.

What is claimed is:

1. An airfoil comprising:
    a leading edge, a trailing edge, a pressure side wall and a suction side wall, said pressure side wall connected to said suction side wall at said leading edge and said trailing edge;
    a plurality of trailing edge slots extending from said trailing edge along said pressure side wall; and
    a plurality of trailing edge openings extending through said trailing edge.

2. An airfoil in accordance with claim 1 further comprising an upper portion connected to a lower portion.

3. An airfoil in accordance with claim 2 wherein said trailing edge slots are formed on said airfoil upper portion.

4. An airfoil in accordance with claim 3 wherein each said trailing edge slot comprises a recessed wall separated from said pressure side wall by a predetermined distance.

5. An airfoil in accordance with claim 4 further comprising at least one land, wherein each said trailing edge slot is separated from an adjacent trailing edge slot by said at least one land.

6. An airfoil in accordance with claim 5 wherein each said land extends from said trailing edge to a cooling cavity exit opening of each said trailing edge slot.

7. An airfoil in accordance with claim 2 wherein said trailing edge openings extend through said lower portion of said airfoil.

8. A turbine blade comprising:
    a platform;
    a dovetail;
    a shank connected to said platform and said dovetail;
    an airfoil comprising a leading edge, a trailing edge, a pressure side wall, and a suction side wall, said pressure side wall connected to said suction side wall at said leading edge and said trailing edge, said airfoil connected to said shank and said platform;
    at least one cooling cavity between said pressure side wall and said suction side wall;
    a plurality of trailing edge slots extending along said trailing edge, said trailing edge slots in flow communication with said cooling cavity; and
    a plurality of trailing edge openings extending through said trailing edge, said trailing edge openings in flow communication with said cooling cavity.

9. A turbine blade in accordance with claim 8 wherein said trailing edge comprises an upper portion and a lower portion.

10. A turbine blade in accordance with claim 9 wherein said plurality of trailing edge slots extend along said trailing edge upper portion.

11. A turbine blade in accordance with claim 10 wherein each said trailing edge slot comprises a recessed wall and a cooling cavity exit opening, said recessed wall extending from said trailing edge to said cooling cavity exit opening.

12. A turbine blade in accordance with claim 11 wherein each said trailing edge slot further comprises at least one land extending from said cooling cavity exit opening to said trailing edge, said at least one land adjacent said recessed wall.

13. A turbine blade in accordance with claim 12 wherein each said trailing edge slot extends along said pressure side wall to said trailing edge.

14. A turbine blade in accordance with claim 9 wherein said plurality of trailing edge openings extend through said lower portion of said trailing edge.

15. A method for cooling a trailing edge of a turbine blade airfoil, the airfoil including a pressure side wall connected to a suction side wall at a leading edge and the trailing edge, the trailing edge including an upper portion and a lower portion, the airfoil further including at least one cooling cavity, at least one trailing edge slot extending along the trailing edge, and at least one trailing edge opening extending through the trailing edge, the cooling cavity in flow communication with the upper portion and the lower portion of the trailing edge, said method comprising the steps of:

- providing cooling air to the cooling cavity such that portion of the cooling air is directed through the at least one trailing edge slot and at least one trailing edge opening;
- cooling the upper portion of the trailing edge utilizing film cooling; and
- cooling the lower portion of the trailing edge utilizing convection cooling.

16. A method in accordance with claim 15 wherein the at least one trailing edge slot further includes a plurality of trailing edge slots formed on the upper portion, said step of cooling the upper portion comprises the step of directing cooling air through the plurality of trailing edge slots.

17. A method in accordance with claim 16 wherein said step of directing cooling air through the plurality of trailing edge slots comprises the step of cooling the pressure side wall with the cooling air.

18. A method in accordance with claim 15 wherein the at least one trailing edge slot further includes a plurality of trailing edge openings formed through the trailing edge at the lower portion, said step of cooling the lower portion comprises the step of directing cooling air through the plurality of trailing edge openings.

19. A method in accordance with claim 15 wherein said step of cooling the upper portion of the trailing edge comprises the step of cooling the upper portion of the trailing edge utilizing convection cooling.

20. A method in accordance with claim 15 wherein the airfoil further includes a root extending from the leading edge to the trailing edge, said step of cooling the lower portion comprises the step of cooling the trailing edge root utilizing convection cooling.

* * * * *